(No Model.) 2 Sheets—Sheet 2.
W. C. EVANS & J. P. SMITH.
NAILING MACHINE.
No. 350,122. Patented Oct. 5, 1886.
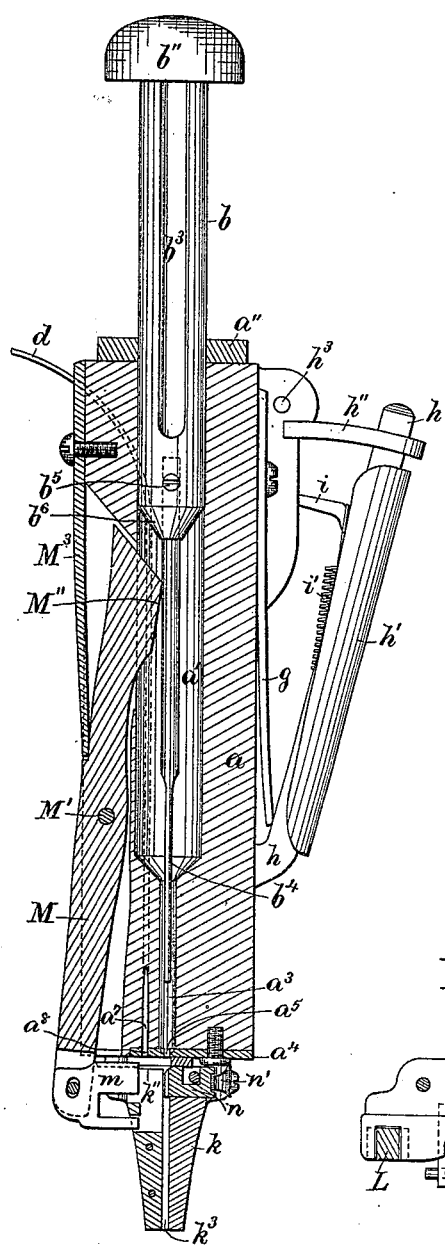
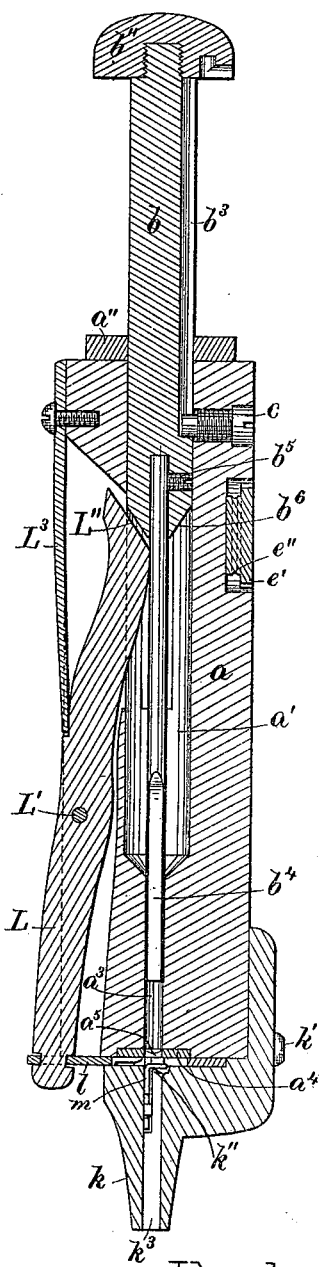
Witnesses
Henry Chadbourn.
John H. Foster.
Inventors
Warren C. Evans
and John P. Smith.
by their Attorney

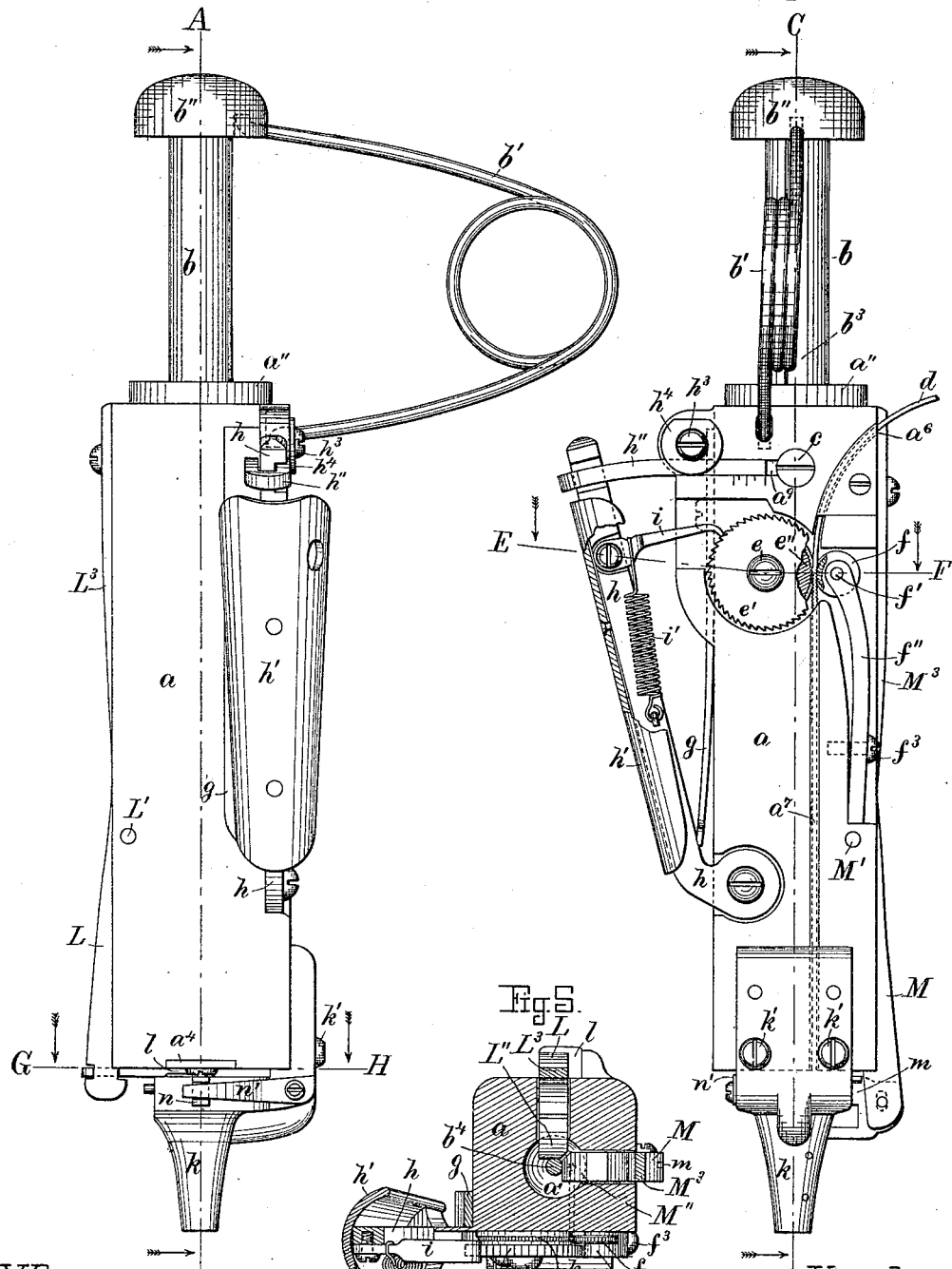

United States Patent Office.

WARREN C. EVANS AND JOHN P. SMITH, OF EXETER, NEW HAMPSHIRE.

NAILING-MACHINE.

SPECIFICATION forming part of Letters Patent No. 350,122, dated October 5, 1886.

Application filed January 4, 1886. Serial No. 187,606. (No model.)

*To all whom it may concern:*

Be it known that we, WARREN C. EVANS and JOHN P. SMITH, both citizens of the United States, and residing at Exeter, in the county of Rockingham and State of New Hampshire, have jointly invented certain new and useful Improvements in Nailing-Machines; and we do hereby declare that the same are fully described in the following specification, and illustrated in the accompanying drawings.

This invention relates to improvements in nailing-machines for the purpose of nailing, pegging, or lasting boots and shoes, and it relates to that class of machines in which a continuous wire is fed downward intermittently, cut off, and driven into the boot or shoe sole or into any other portion of the boot or shoe—for instance, through the overlapping edge of the upper and the insole in the process of lasting the boot or shoe, through the outer sole, upper, and insole in the process of pegging boots or shoes, or through the outer and inner sole in the process of "quilting" or nailing the soles of boots and shoes, as will hereinafter be more fully shown and described, reference being had to the accompanying drawings, where—

Figure 1 represents a side elevation of the machine, and Fig. 2 represents a front view of it. Fig. 3 represents a vertical section on the line A B shown in Fig. 1. Fig. 4 represents a vertical section on the line C D shown in Fig. 2. Fig. 5 represents a cross-section on the line E F shown in Fig. 2. Fig. 6 represents a cross-section on the line G H shown in Fig. 1. Fig. 7 represents a cross-section of the driver; and Fig. 8 represents a side elevation of the nail.

Similar letters refer to similar parts wherever they occur on the different parts of the drawings.

In this machine we use intermittent rotary feed-rollers, between which the wire is fed downward to the cutting-off mechanism, such feed-rollers being serrated or corrugated, so as to indent, serrate, or corrugate the wire as it is fed downward between said feed-rollers, and by this arrangement we are enabled to use a plain and comparatively inexpensive wire that is automatically corrugated between the feed-rollers, which latter are arranged between the place where the wire enters the frame or handle and the nail-tube where the nail is driven.

In the drawings the improvements are shown as applied to and arranged on a hand-tool; but we wish to state that the invention is equally well adapted for a machine driven by belt or other power, as may be desired, without departing from the spirit of our invention.

$a$ is the frame or handle, having a longitudinal perforation, $a'$, in its upper end, in which the driver-bar $b$ is guided, as usual, such driver-bar being normally held in its highest position by the influence of the spring $b'$, interposed between the top of frame or handle $a$ and the head $b''$ of the driver-bar, as shown.

$b^3$ is a longitudinal groove on one side of the driver-bar, into which projects the inner end of the set-screw $c$, serving to prevent the driver-bar from turning around in its bearing $a'$, and also as a stop to prevent the driver-bar from being pushed too far upward by the spring $b'$.

$a''$ is a leather or other elastic washer surrounding the driver-bar above the top of frame or handle $a$, against which the under side of the head $b''$ of the bar $b$ strikes when the said driver-bar is forced downward to the end of its stroke.

Centrally in a line with the perforation $a'$ is made in the lower end of the frame or handle $a$ a smaller perforation, $a^3$, large enough for the driver $b^4$ to pass through easily. The driver $b^4$ is secured to the bar $b$ by means of a set-screw, $b^5$, (shown in Fig. 4,) or in other well-known or equivalent manner. The lower end of the driver $b^4$ is made rectangular or of flattened shape, as shown in Fig. 7, for a purpose as will hereinafter be more fully described.

To the lower end of the handle $a$ is secured a small plate, $a^4$, having a perforation, $a^5$, directly below the driver and corresponding in shape and size to that of the lower end of the driver shown in Fig. 7.

$d$ is the wire, that is made to enter a side opening, $a^6$, near the upper end of the frame $a$, as shown in Fig. 2, and after being corrugated while in the act of being fed it is made to pass through channel $a^7$ in frame $a$ and out through a perforation, $a^8$, in the plate $a^4$, as shown in Fig. 3, which perforation is located at one side of the perforation $a^5$, through which the driver is made to pass.

Upon a pin or stud, $e$, is loosely journaled the ratchet-wheel $e'$, back of which is secured or made in one piece with it the corrugating-wheel $e''$, as shown. The wire $d$, from which the nails are made, is made to pass between the corrugated wheel $e''$ and the corrugated roller $f$, that is mounted loosely on a pin, $f'$, secured to the upper end of the spring-bar $f''$, the latter being secured in its lower end to the frame $a$ by means of the screw $f^3$, that is made adjustable, and by tightening or loosening the said screw any desired pressure may be brought to bear on the wire $d$ as it is fed downward and corrugated by passing between the corrugated rollers $e''$ and $f$. It will thus be seen that we use ordinary plain wire, which we corrugate by the feed-rollers, as above described, while the wire is in the act of being fed downward to the cutting-off mechanism.

To impart an intermittent rotary motion to the feed-wheel $e''$ and its ratchet-wheel $e'$, we hinge to frame $a$, near its lower end, the lever $h$, that is normally held outward, as shown in Fig. 2, by the influence of the spring $g$, interposed between said lever $h$ and frame $a$, as shown, such lever having hinged to it, near its upper end, the pawl $i$, the free end of which engages with the teeth of the ratchet-wheel $e'$, and is held in contact with the same by means of the spring $i'$, attached to lever $h$ and pawl $i$, as shown in Fig. 2, or in a similar manner.

$h'$ is a shield-plate secured to lever $h$, as usual, for the operator to take hold of while in the act of feeding the wire downward. The upper end of lever $h$ is guided in the slotted or forked guide-piece $h''$, and by means of such guide-piece the outward swing of said lever $h$ is limited according to the length of wire that is to be fed downward for each stroke of said lever $h$. The inner end of guide-piece $h''$ is located in a groove, $a^9$, in which it can be adjusted to and from the center of the frame $a$, and after being so adjusted it is to be secured, by means of screw $h^3$ and washer $h^4$ or similar fastening device, to frame $a$. Thus it will be seen that the feed of the wire can be adjusted as may be desired for different lengths of nails simply by arranging the guide-piece $h''$ accordingly on the frame $a$, as described.

The kind of nail which we make and drive by the improved machine is shown in Fig. 8, it having a shank, $d'$, having in its upper end a bend or knee-head, $d''$, and this kind of nail may further be provided with a point, if so desired, but can be driven without being pointed.

The nail is automatically cut off from the wire $d$, headed, as above described, and carried to a place directly above the perforation in the nail-tube previous to being driven by the following mechanism.

$k$ is the nail-tube secured at the lower end of frame or handle $a$ by means of screws $k'$ $k'$ or other suitable fastening device.

$l$ is the shear or cutter by means of which the wire is cut and bent to the form shown in Fig. 8, said shear being located directly below the lower plate, $a^4$, and between it and the top of nail-tube $k$, its outer end being connected to the lower end of the cutter-lever L, that is pivoted at L' to frame $a$, on which fulcrum it is made to rock. During the descent of the driver-bar $b$ its lower tapering end, $b^6$, comes in contact with the upper inclined end, L'', of lever L, thereby causing said lever to rock on its fulcrum and thereby causing the inner end of cutter $l$ to pass by the perforation $a^3$ in plate $a^4$, through which the wire $d$ is fed downward, and thus cut the wire, and after being cut its upper end is bent, as shown in Fig. 8, by the forward end of the cutter $l$ forcing the upper portion of the cut wire against the stationary lip or bender projection $k''$, located in the nail-tube $k$, as shown in Figs. 4 and 6.

L³ is a spring, secured in its upper end to frame $a$, and having its lower end pressing on lever L, above its point of suspension, so as to automatically return said lever and its cutter to their normal positions shown in the drawings, as soon as the driver-bar $b$ ceases to act on said lever L, which takes place when the driver-bar, by the influence of its spring $b'$, is returned to its highest position, as shown.

$k^3$ is the longitudinal perforation in the nail-tube $k$, through which the nail is driven, and such perforation is arranged directly below and in a line with the perforation $a^3$ in the lower portion of the frame $a$, through which the driver $b^4$ descends. As the wire is cut off and bent a short distance from the perforation $k^3$ in the nail-tube, it is of course necessary that the finished nail should be automatically carried directly below the driver and there held until the driver reaches it in its downward stroke, and for this purpose we arrange in a guide or slot in the upper end of the nail-tube $k$, at a right angle to the cutter $l$, an angular carrier, $m$, the outer end of which is connected to the carrier-lever M, that is pivoted at M' to frame $a$, on which fulcrum it is made to rock. In its upper end said lever M has an incline, M'', that comes in contact with the tapering end $b^6$ of the driver-bar $b$ during the descent of the latter, and thereby causes the lever M to rock on its fulcrum M' against the influence of the spring M³, secured to the upper end of frame $a$, and having its lower free end pressing against the lever M at a place between its fulcrum and upper end, as shown. During such downward motion of the driver-bar the lower end of lever M is moved inward, and with it the carrier $m$ is caused to move at right angle to and a little below the cutter $l$, whereby the headed nail is automatically carried from the place in which it was cut and bent by the cutter $l$ to a position directly above the perforation $k^3$ in the nail-tube, and to prevent it from dropping until it is struck by the driver we arrange in the upper portion of the nail-tube $k$, directly opposite the nail-carrier $m$, a yielding die, $n$, located in a suitable guide in the nail-tube $k$, and forced inward a limited distance by means of a spring, $n'$. Between the inner end of the carrier $m$ and the yielding die $n$ the nail is held with a slight frictional resistance until forced downward through the perforation in the nail-tube and into the boot or shoe by the action of the driver $b^4$. It will be noticed that the upper end of carrier-lever M does not project upward as far as the cutter-lever L, and this is done so that the driver-bar $b$ during its descent shall first actuate the cutter-lever to enable the cutter $l$ to cut and bend the wire before the carrier $m$ is actuated.

The operation of the machine is as follows: The shoe to be lasted, nailed, or pegged is arranged upon a last secured to a jack or other stationary support, as is usual in the art. The operator then grasps the frame or handle in one hand and places the lower end of the nail-tube against such place on the sole or upper in which the nail is to be driven. He then presses the feed-lever toward the handle, causing the desired length of wire to be fed downward below the cutting-off mechanism, and during such feed of the wire such portion as passes between the feed-rolls is corrugated. The operator then, by means of a mallet or hammer, strikes the upper end of the driver-bar, causing it to descend against the influence of its reaction-spring, and during such descent of the driver-bar its incline $b^6$ first actuates the shear-lever L, causing the shear to cut off the desired length of wire, and by forcing it against the stationary rest or bender $k''$ the knee-head of the nail is formed and the shear remains stationary during the further descent of the driver-bar. After the nail-blank is cut off and headed, as above described, the aforesaid incline on the driver-bar actuates the carrier-lever M, causing the angular carrier $m$ to carry the nail from its first position directly above the hole in the nail-tube and against the laterally-yielding die $n$, between which and the angular nail-carrier the nail is held until, by the further descent of the driver-bar, the lower end of the driver strikes it and forces it into the sole of the boot or shoe. During the upward motion of the driver-bar, which is caused by the reaction-spring $b'$ after the nail is driven, the shear, carrier, and laterally-yielding die are returned to their original positions by the influence of their respective springs $L^3$, $M^3$, and $n'$. Previous to the feeding and driving of another nail the operator releases his grasp on the feed-lever, when its spring $g$ will automatically carry it to its normal position, ready for feeding another portion of the nail-wire, as shown in Fig. 2, and so on.

Having thus fully described the nature, construction, and operation of our invention, we wish to secure by Letters Patent and claim—

1. In a nailing-machine, the frame or handle $a$, having hinged to it the feed-lever $h$, provided with pawl $i$, for actuating the ratchet-wheel $e'$, and corrugated feed-rolls $e''$ $f$, in combination with the adjustable guide-piece $h''$, adapted to be secured on the said frame or handle $a$, for the purpose of regulating the feed of the wire according to the length of nail required, as herein set forth.

2. In a nailing-machine, the laterally-movable cutter $l$, combined with the stationary projection $k''$, arranged in the nail-tube $k$, for the purpose of cutting off a nail-blank and forming a knee or bent head on the upper end of the nail, as herein set forth and described.

3. In a nail-driving machine, the handle $a$, and vertically-movable driver-bar $b$, having incline $b^6$, as described, in combination with the cutting-off and heading mechanism consisting of lever L L'', hinged at L', spring $L^3$, laterally-movable cutter $l$, and stationary projection $k''$ in nail-tube $k$, as and for the purpose set forth.

4. In a nail-driving machine, the laterally-movable cutter $l$, and stationary projection $k''$ in nail-tube $k$, combined with the laterally-movable nail-carrier $m$, and the yielding die $n$, as and for the purpose set forth.

5. In a nail-driving machine, the handle $a$, and vertically-movable driver-bar $b$, having incline $b^6$, as described, in combination with the nail-carrier mechanism consisting of lever M M'', hinged at M', spring $M^3$, and the angular carrier $m$, connected to the lower end of lever M, and adapted to move laterally in bearings in the nail-tube $k$, as and for the purpose set forth.

In testimony whereof we have affixed our signatures in presence of two witnesses.

WARREN C. EVANS.
JOHN P. SMITH.

Witnesses:
ARTHUR O. FULLER,
WILLIAM P. MOULTON.